United States Patent
Chen

Patent Number: 5,396,160
Date of Patent: Mar. 7, 1995

[54] METHOD OF REAL-TIME MACHINE PATH PLANNING FROM A MATH MODEL

[75] Inventor: Yilong Chen, Rochester Hills, Mich.

[73] Assignee: General Motors Corporation, Detroit, Mich.

[21] Appl. No.: 666,980

[22] Filed: Mar. 11, 1991

[51] Int. Cl.6 .......................................... G05B 19/42
[52] U.S. Cl. ................................. 318/573; 318/571; 318/572; 318/577; 395/119; 364/474.24
[58] Field of Search .................... 318/560-630; 364/474.01-474.32; 395/80-99, 119; 901/3, 5, 7, 9, 12, 13, 17, 19, 23; 414/730-735

[56] References Cited

U.S. PATENT DOCUMENTS

| | | | |
|---|---|---|---|
| 4,453,221 | 6/1984 | Davis et al. | 318/573 |
| 4,506,335 | 3/1985 | Magnuson | 318/571 |
| 4,550,383 | 10/1985 | Sugimoto | 318/573 |
| 4,554,497 | 11/1985 | Nozawa et al. | 318/571 |
| 4,603,286 | 7/1986 | Sakano | 318/572 |
| 4,648,024 | 3/1987 | Kato et al. | 318/573 |
| 4,652,804 | 3/1987 | Kawamura et al. | 318/573 |
| 4,689,756 | 8/1987 | Koyama et al. | 318/573 |
| 4,706,003 | 11/1987 | Nakashima et al. | 318/615 X |
| 4,728,872 | 3/1988 | Kishi et al. | 318/603 |
| 4,821,207 | 4/1989 | Ming et al. | 318/573 |
| 4,833,381 | 5/1989 | Taft | 318/577 |
| 4,835,710 | 5/1989 | Schnelle et al. | 318/574 |
| 4,843,287 | 6/1989 | Taft | 318/573 X |
| 4,849,679 | 7/1989 | Taft et al. | 318/577 |
| 4,858,140 | 8/1989 | Buhler et al. | 318/573 |
| 4,868,761 | 9/1989 | Hayashi | 364/474.24 |
| 4,879,663 | 11/1989 | Fuehrer | 318/573 |
| 4,903,213 | 2/1990 | Buhler et al. | 318/573 |
| 4,952,772 | 8/1990 | Zana | 318/577 |
| 4,965,499 | 10/1990 | Taft et al. | 318/568.11 |
| 5,004,968 | 4/1991 | Mizuno et al. | 318/615 |
| 5,027,045 | 6/1991 | Iwagaya | 318/571 |
| 5,043,644 | 8/1991 | Sasaki et al. | 318/568.23 |
| 5,073,748 | 12/1991 | Boehm | 318/569 |
| 5,107,444 | 4/1992 | Wu | 395/119 |

*Primary Examiner*—Paul Ip
*Attorney, Agent, or Firm*—Michael J. Bridges

[57] ABSTRACT

A robot carrying a milling cutter or other multi-axis machine cuts a physical model and is directly driven in real time from a CAD generated mathematical model. The path planning is carried out in parametric space but with velocity constraints in the machine coordinate space. The method will generate proper points in parametric space and then map to machine space to minimize interpolations needed by machine controller to improve tracking accuracy while achieving the desired cutting velocity. Point data is computed by the microcomputer and transferred to the machine controller continuously while the machine is cutting. Long precutting computation times are eliminated.

1 Claim, 5 Drawing Sheets

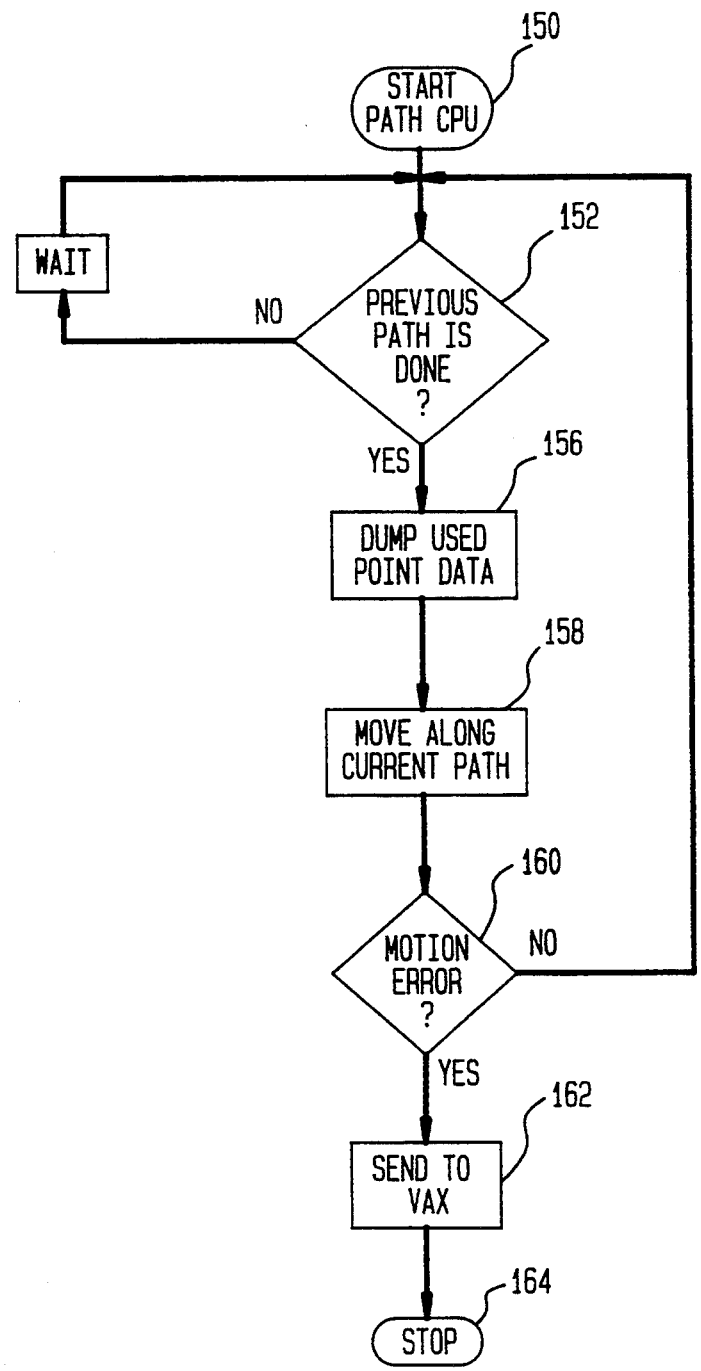

METHOD OF REAL-TIME MACHINE PATH PLANNING FROM A MATH MODEL

FIELD OF THE INVENTION

This invention relates to control of multi-axis machines and particularly to driving such machines from a mathematical model corresponding to the machine path and for real time path planning.

BACKGROUND OF THE INVENTION

Because the styling of an automobile is so critical to customer acceptance, considerable effort is expended in designing and accurately representing the visible inner and outer surfaces of the vehicle. Most of this design effort has historically involved the creation of concept designs (artist sketches, renderings and drawings) followed by the sculpturing of ⅜ or full scale clay models. It has been proposed to integrate computer aided design (CAD) systems into this design process. Models designed or represented within such CAD systems can be rendered on a two-dimensional graphics screen using color and shading to produce life-like images of the defining mathematical surfaces. Despite these powerful CAD design and evaluation tools, designers and others find it necessary to create, view and evaluate a hard, physical, three-dimensional realization of the mathematical model in order to effectively evaluate a particular concept. Hard models are also needed to evaluate the aerodynamic performance of a proposed design. Once a model has been designed on a CAD system, an accurate, hard model ideally should be produced rapidly with minimal user involvement. In the best of situations, hard model generation would proceed so rapidly that the process of CAD design and model realization/evaluation could proceed interactively.

Prior attempts to use the CAD mathemetical models as data sources for numerically controlled milling machine control resulted in the procedure of calculating all the points for the cutting tool path and storing the points in the N/C machine. Because so many points are required to define the cutting path for the entire model, the time required is burdensome. For a three-axis milling machine, many hours are required to calculate the points from the CAD model. For instance, a pre-cutting path generation time of 14 hours is required for a ⅜ scale concept model. For a five-axis machine, even more time may be required to calculate the tool path. According to the present invention, a more efficient way of generating a tool path from CAD data and transferring it to the cutting machine permits cutting to begin in a minute (instead of hours or days) from the beginning of the calculations. Thereafter, the tool path calculation proceeds in real time and is fed to the machine one line at a time so that minimal data storage space is required. The cutting machine may be an N/C milling machine which can cut any hardness material from clay to steel with high accuracy, or a robot carrying a mill which is faster, less expensive and more flexible than most milling machines but has lower accuracy.

Traditionally, the point data of a tool path can be generated by well known "teaching by doing" techniques for robots, or they can be generated from math models by computers. Even in the second case, only the geometric information of the data points in real world Cartesian space, but not their relation with respect to time, can be extracted from the math models and given to machine operators. The current available computer software often use equal distance intervals between data points to generate tool paths, or generate the data points in such a way that the maximum deviations of the straight lines, which connect two consecutive points, from the desired path is within tolerance. In either case, any downstream need of machine motion control is not being considered and involved in this early stage of the tool path generating process. Similarly, when the robot or machine operators receive the discrete point data they have no knowledge and control of the math model nor of the tool path data generating process. They have to passively follow these point data with a given speed and use their own interpolation between these given points to achieve smooth motions. This procedure is carried on without regard to the actual contour of the CAD model since that information, other than the supplied discrete data points, is not available to the controller. The result is 1) the data points generated and supplied are not efficient and suited to the downstream use from the motion control point of view, and 2) the interpolation may introduce a deviation from the desired path.

The proposed solution to this problem is to drive the robot directly by the math model, instead of doing the path planning in Cartesian space; that is, to do the path planning in parametric space using the math model to generate the points wherever necessary so that only minimal interpolation by the robot controller is needed and the points are spaced to assure accurate and desired smooth machine motion. A result of the solution is a path planning method applicable to robot usage for cutting or other trajectory tracking operations as well as to other multi-axis machine operations. The solution is especially adapted for real time machine operations but can be used also for teaching a path which is stored for use after the whole path is calculated. This eliminates the need to teach a path by a teaching pendant whereby the machine is jogged through a desired path and the path points are inserted one at a time by operator direction, or by an off-line work station using computer graphical animation to interactively develop path points. Both of these prior techniques are slow and are limited to tool path generating processes which ignore the downstream requirements on machine motion control.

SUMMARY OF THE INVENTION

It is therefore an object of the invention to provide a method of using a mathematical model of a curve or surface to directly drive a machine through a path. It is another object to provide a method of path planning from a CAD model for a robot or other multi-axis machine for smoother and more accurate machine movements. Another object is to provide such a method which generates sufficient path data points to eliminate or reduce the need for path interpolation. Still another object is to provide such a method which operates in real time to essentially eliminate calculation time prior to beginning cutting or other machine operation.

The invention is carried out in a system for controlling the path of a multi-axis machine by a mathematical model representing the curve or surface containing the path by the method of controlling the machine comprising the steps of: planning the path of the machine in parametric space using the mathematical model to efficiently generate path data points in proper density to minimize the need of interpolation between points;

translating each point to the coordinate space of the machine, and operating the machine along the path defined by the data points.

BRIEF DESCRIPTION OF THE DRAWINGS

The above and other advantages of the invention will become more apparent from the following description taken in conjunction with the accompanying drawings wherein like references refer to like parts and wherein:

FIGS. 6 through 8 are flow charts representing the general program instructions of the computers and the interrelationship of path planning and machine execution, according to the invention.

DESCRIPTION OF THE INVENTION

The ensuing description is directed to a method of path planning of a robot for cutting a clay model of a vehicle. The method has much broader applications, however. For example, the robot may be used for trajectory tracking functions such as spray painting or applying sealant to a vehicle body. The path planning method can be applied to machines other than robots such as 3-axis or 5-axis milling machines to realize efficient tool path planning and the virtual elimination of computation time while maintaining the very high accuracy of such milling machines.

Figure 1:
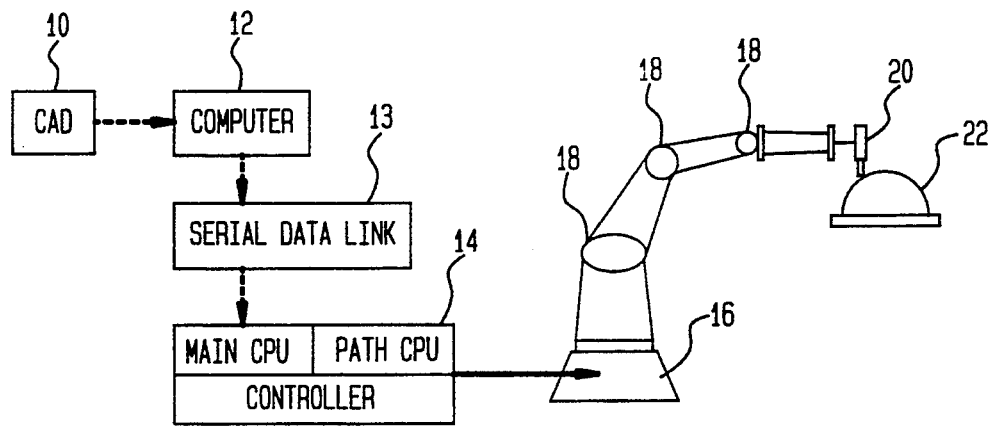
FIG. 1 is a schematic drawing of a system for carrying out the method of the invention.

The diagram of FIG. 1 shows a system to rapidly cut ⅜ scale clay models designed on a computer aided design (CAD) system 10. Mathematical surfaces of vehicle exteriors can be rapidly designed at a CAD system terminal, and color images of almost photographic realism can be quickly generated and displayed on two-dimensional console screens. The designed surface or math model is transferred to a microprocessor based computer 12 by direct line connection or by other means such as floppy discs. The computer 12 which is a VAX (TM) for instance, is directly coupled by a serial data link 13 to a robot controller 14 which comprises a main central processing unit (CPU) and a path CPU. The robot controller 14, in turn, controls a robot 16 having a plurality of joints 18 and carrying a milling cutter 20. A mass of clay 22 is positioned to be shaped by the cutter 20 to give three-dimensional reality to the math surface. The resulting model can be evaluated for appearance by observation and for aerodynamics by wind tunnel tests. Any changes can be incorporated into the math model by the CAD system 10 and can be immediately recut by the robot, addressing only the region incorporating the change.

Figure 2:
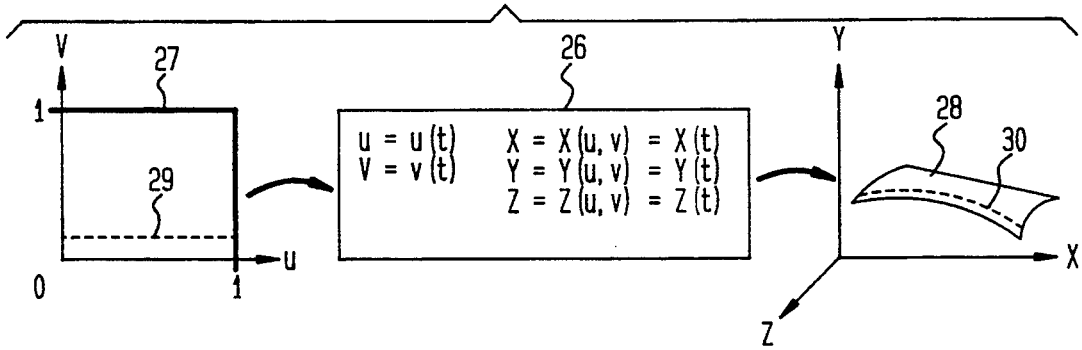
FIG. 2 is a schematic drawing illustrating the transformation from two dimensional parametric space to three dimensional Cartesian space by a mathematical model.

The math model of a surface provided by the CAD 10 typically uses B-spline formulas which relate parametric space to real world Cartesian space. The spline surface is a linear combination of control points weighted by separable bivariate tensor-product B-splines. This well known mathematical process is fully set forth in the publications, Besl, P. J., "*Geometric Modeling and Computer Vision*", Proceedings of the IEEE, Vol. 76, No. 8, August 1988, and de Boor, Practical Guide to Splines", Springer-Verlag, New York, which are incorporated herein by reference. As illustrated in FIG. 2, the corresponding surface in parametric space 27 is a plane defined by the parameters u and v. It is necessary to use techniques that marry the purely geometric information provided by the mathematical surface definitions with physical smoothness requirements demanded by robot tool tip motions (requirements on velocities and accelerations) in order to calculate paths in the parametric space that can later be tracked to produce Cartesian motions which accurately follow the desired space curves on the surface in the real world Cartesian space.

The math model, represented by the box 26, reveals that The parametric plane can be covered by a series of lines, e.g. lines parallel to the axis u or v. The parameters u, v may be properly planned and expressed as a function of time, i.e. $u = u(t)$, $v = v(t)$. The B-spline math surface is defined by $x = x(u,v)$, $y = y(u,v)$, $z = z(u,v)$ which in turn can be expressed as functions of time. The math model is a transfer function which maps points on the parametric plane 27 onto a curved surface 28 in Cartesian coordinates. Thus each point in parametric space corresponds to a point in Cartesian space and a line 29 in parametric space corresponds to a line 30 in Cartesian space or machine space. For each path of cut on the clay model, it may be desirable to hold one of the parameters u or v constant and vary the other parameter to extract all the points needed for that path of cut; e.g. hold v constant and vary u to traverse line 29 to generate points on the path of cut 30.

Thus a family of closely spaced parallel isoparametric space curves is defined on such a surface 28 by sequencing one of the parametric variables through a set of fixed monotone values and allowing the remaining variable to continuously vary. These isoparametric space curves are then represented by sets of discrete data in Cartesian or machine coordinates and are cut in order one at a time to carve out the entire clay surface.

Robot path planning in 6-dimensional joint space becomes a task of deriving smooth, time dependent joint trajectories which then produce robot motions satisfying Cartesian accuracy requirements imposed by the clay cutting application. The robot controller is well suited to determine the joint control for each axis and to use filtering to assure smooth motions. To that extent the path planning remains under control of the controller and the controller works with the discrete data generated by the computer 12. However it is necessary to provide discrete data of sufficient density to avoid intolerable deviations from the ideal path, and yet not having such data density that the cutting operation is slowed down. The determination of proper data points requires a recognition of the robot velocity which would result from a given sequence of data points executed at a given rate (which velocity can be determined from the math model). By taking care of both the task need and the need of robot motion control at the early stage of generating point data and path planning in parametric space, surface tracking accuracy can be controlled while at the same time achieving the desired smoothness of axis motions along isoparametric cutter path lines with less requirement on joint level filtering which sacrifices the tracking accuracy for motion smoothness.

The procedure for planning a cutting path from a math model requires some set-up by the operator to input certain information such as the cutter type and diameter, the overlap of adjacent cuts etc. Two important parameters for optimum operation are the time interval, delta-t, between adjacent path points and the desired velocity in cartesian space, $V_d$. The time interval is limited by the larger one of the computation time, which depends on computational load for determining each point and the computer speed, and the sampling time of the robot controller. Usually, the sampling time of the robot controller, which may be, for instance, 64 ms for linear mode motion and 32 ms for joint mode motion, is larger than the computing a point data on a microcomputer. So the time interval may be 64 msec, for example. The desired velocity $V_d$ of the cutting tool along the cutting path is determined by the kind of robot in use, the type of cutting tool and material, and the application. The desired velocity may be 100 mm/sec, for example. The remainder of the procedure is automatic: that is, the path planning and cutting are carried out by computer program without operator interaction.

After the parameters are input to the computer 12, the position of each point in Cartesian space $[x_i, y_i, z_i]$ is determined in parametric space constrained by the desired velocity $V_d$ and the time interval. To find that point in parametric space it is necessary to determine the equivalent velocity in parametric space by reference to the math model. The coordinate p of a point in Cartesian space is related to parametric coordinates as the vector $p(u,v) = [x(u,v), y(u,v), z(u,v)]$. If one parameter u or v varies while the other remains fixed, we have as the curve function the vector $p(s) = [x(s), y(s), z(s)]$, where s can be either u or v. The velocity value of V is $$V = [(dx/dt)^2 + (dy/dt)^2 + (dz/dt)^2]^{\frac{1}{2}} = (ds/dt)$$
$$[(\partial x/\partial s)^2 + (\partial y/\partial s)^2 + (\partial z/\partial s)^2]^{\frac{1}{2}}$$

where ds/dt can be viewed as the velocity in parametric space and $[(\partial x/\partial s)^2 + (\partial y/\partial s)^2 + (\partial z/\partial s)^2]^{\frac{1}{2}} = R$ is the ratio of the velocity V in Cartesian space to the velocity in parametric space. The value of R can be calculated recursively, as set forth in the aforementioned Besl and de Boor publications. The velocity ratio R varies according to the local surface shape and is computed for each point. Then for the desired velocity $V_d$ of the cutting tool, the velocity in parametric space should be computed as $ds/dt = V_d/R$. For a particular point i the spacing delta-$S_i$ from the previous point is calculated as delta-$S_i$ = ds/dt * delta-t. Adding this spacing to the coordinates of the previous point gives the new point $S_i$ in parametric space and the corresponding point in Cartesian space represented by the vector $[x(s_i), y(s_i), z(s_i)]$ is determined directly from the math model.

Thus the point spacing in Cartesian space is consistent with the desired velocity $V_d$ when the robot moves from one point to the next in each time interval. This provides proper point density for the robot to execute the path movement without interpolating to determine intermediate points and sufficient time is provided for joint motions to be carried out smoothly.

Figure 3:
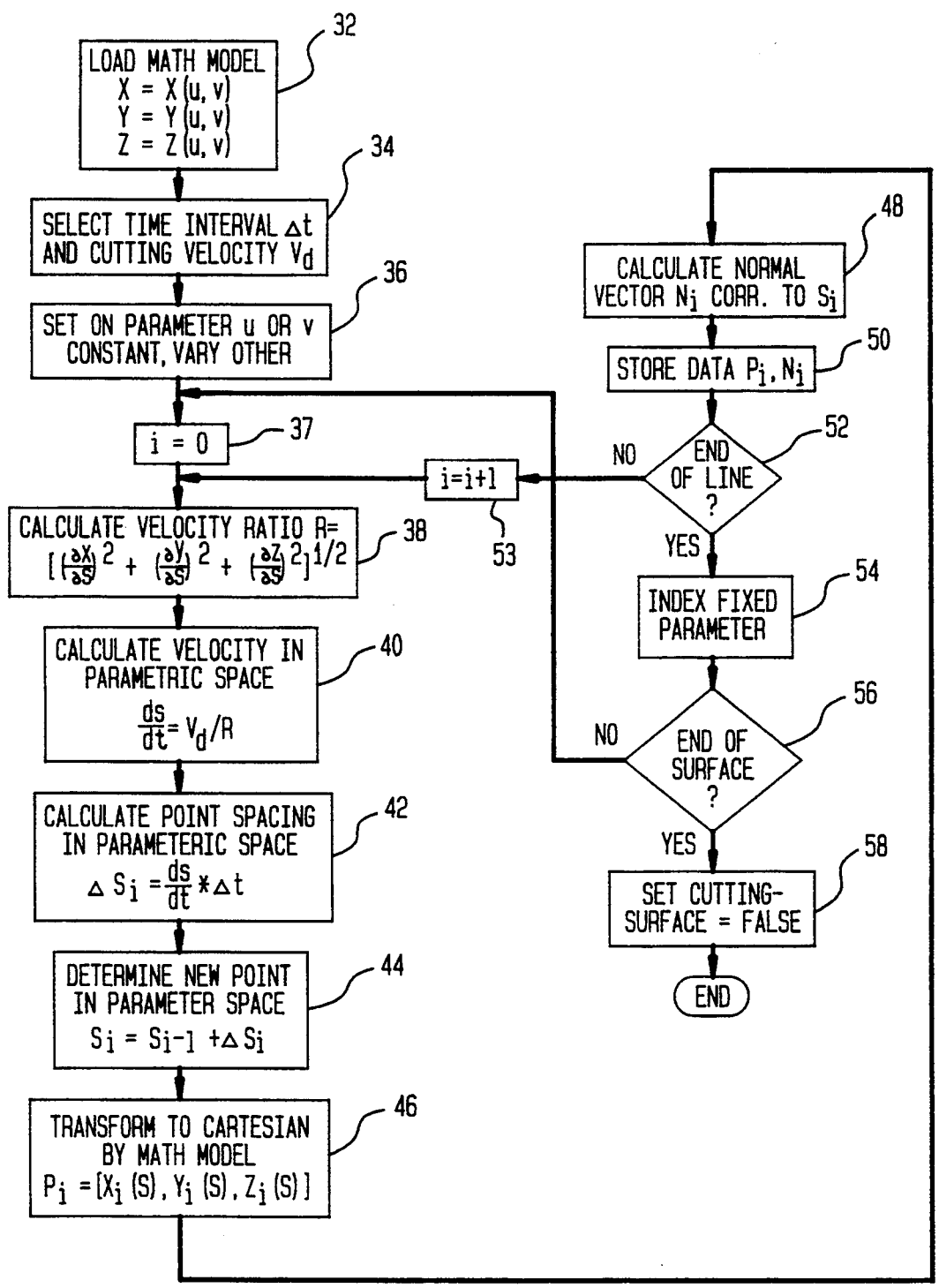
FIG. 3 is a flow diagram of the method of machine path planning according to the invention.

The flow chart of FIG. 3 summarizes the above described procedure of path planning in parametric space. The reference numerals of each block are shown in angle brackets <nn> in the description of each function. First the math model generated by CAD is loaded into the computer <32>, then an operator selects a time interval and a desired cutting velocity <34>. The operator selects one parameter u or v to hold constant and allows the other to vary <36>. Then the point index i is set to zero <37>. Next, for a given point, the computer calculates the velocity ratio R for that point from the math model <38>, and then calculates the velocity ds/dt <40>, the point spacing delta-S <42>, and determines the new point in parametric space <44>. The new point is transformed to Cartesian space by the math model <46>. A vector $N_i$ normal to the surface at the new point is computed <48> and the data $P_i$ and $N_i$ are stored <50> until all the points for a line of cut are determined and, after incrementing the point index i <53>, the process is repeated <52> starting at block 38, for the next point. When all the points have been calculated for one cutting path <52> the fixed parameter (u or v) is indexed to a value for the next cutting path <54>, the program returns to block 37, and the process continues. When the surface has been completed <56>, a cutting-surface flag is set <58> for a control purpose yet to be described. The normal vector $N_i$ is calculated from the math model by well-known techniques and is used to correctly orient the cutter with respect to the surface.

Figure 4A:
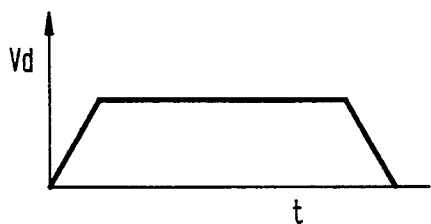
FIGS. 4a and 4b are diagrams of machine velocity profiles for use by the method shown in FIG. 3.
Figure 4B:
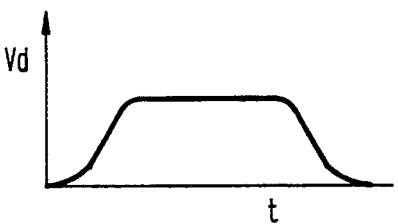

To avoid sudden starts and stops at the ends of each cutting path as well as to have smooth motion in between, it is desirable to limit acceleration to a maximum. This can be done by choosing the desired velocity value $V_d$ in block 34 to increase gradually at the beginning of each line and similarly decrease gradually at the end of each line, with smooth motion in between, as shown in FIGS. 4a and 4b, to avoid high acceleration. The velocity profile may comprise intersecting straight line segments as shown in FIG. 4a or, to avoid high jerk, may incorporate gentle curves as indicated in FIG. 4b.

Figure 5:
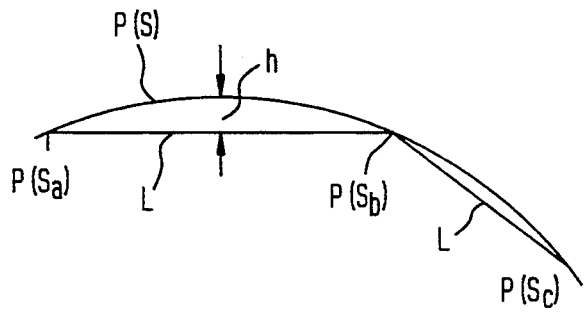
FIG. 5 is a diagram illustrating deviation of machine path from an ideal curve.

An optional function is to verify that the series of data points does not lead to a cutting path which deviates from the mathematical surface by an unacceptable amount. In FIG. 5 the curve p(S) is the mathematical curve for the cutting path and points $P(S_a)$, $P(S_b)$, and $P(S_c)$ are consecutive calculated data points. Assuming linear cutter motion between points, the path deviation h is the distance between the curves and point-connecting lines L. The maximum value of h is computed for each pair of points and if it exceeds a preset maximum tolerance the point spacing is reduced by a factor of two and the deviation is verified again. In this case, the cutter velocity will be slower than the desired velocity, but the error will be guaranteed to be within the preset tolerance level. The method of making such a calculation is well known and is not included here. The computational load for such a calculation is not so great as to be impractical but in most cases may be dispensed with where the point density is sufficient to avoid large deviations.

Figure 6:
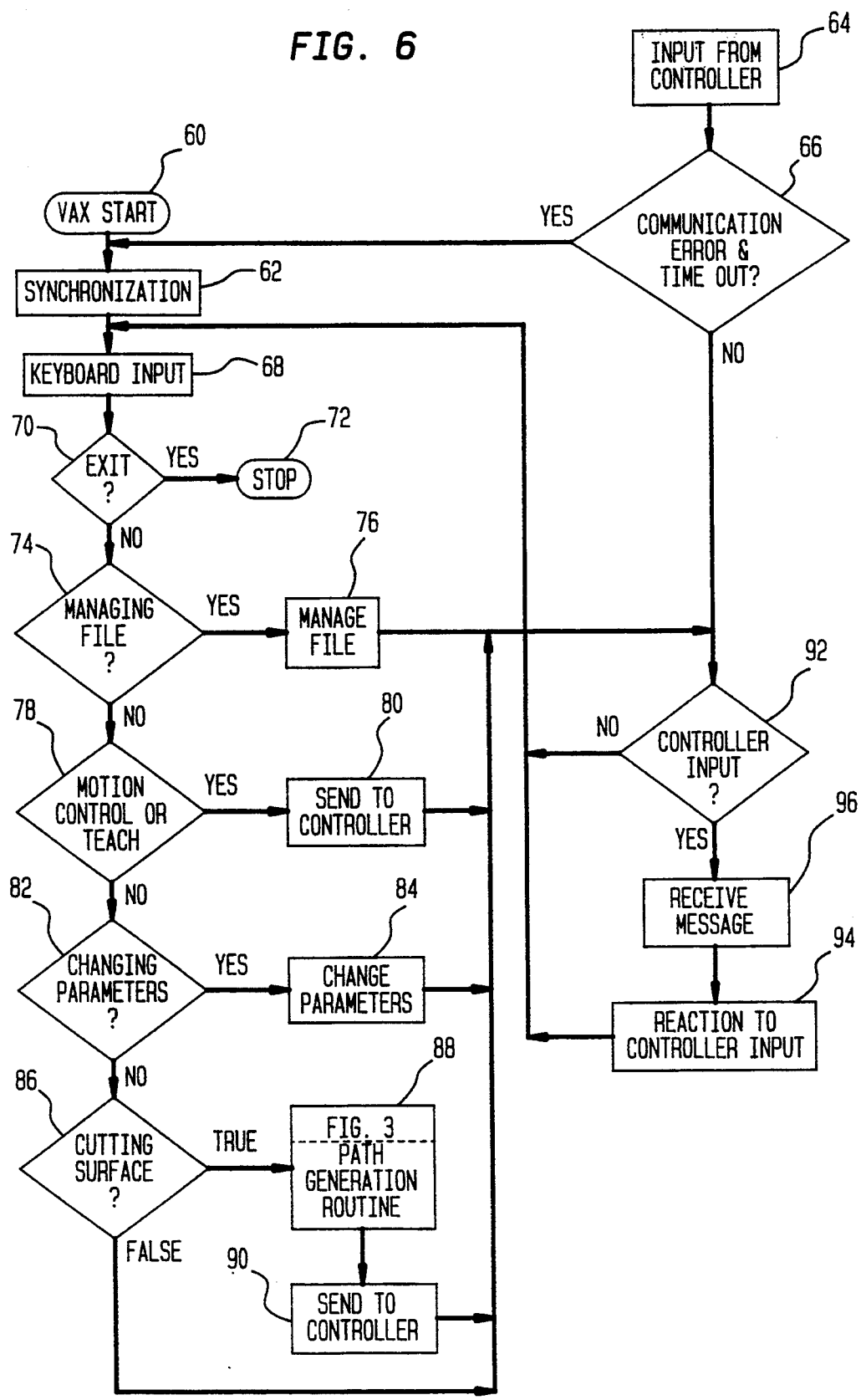
Figure 7:
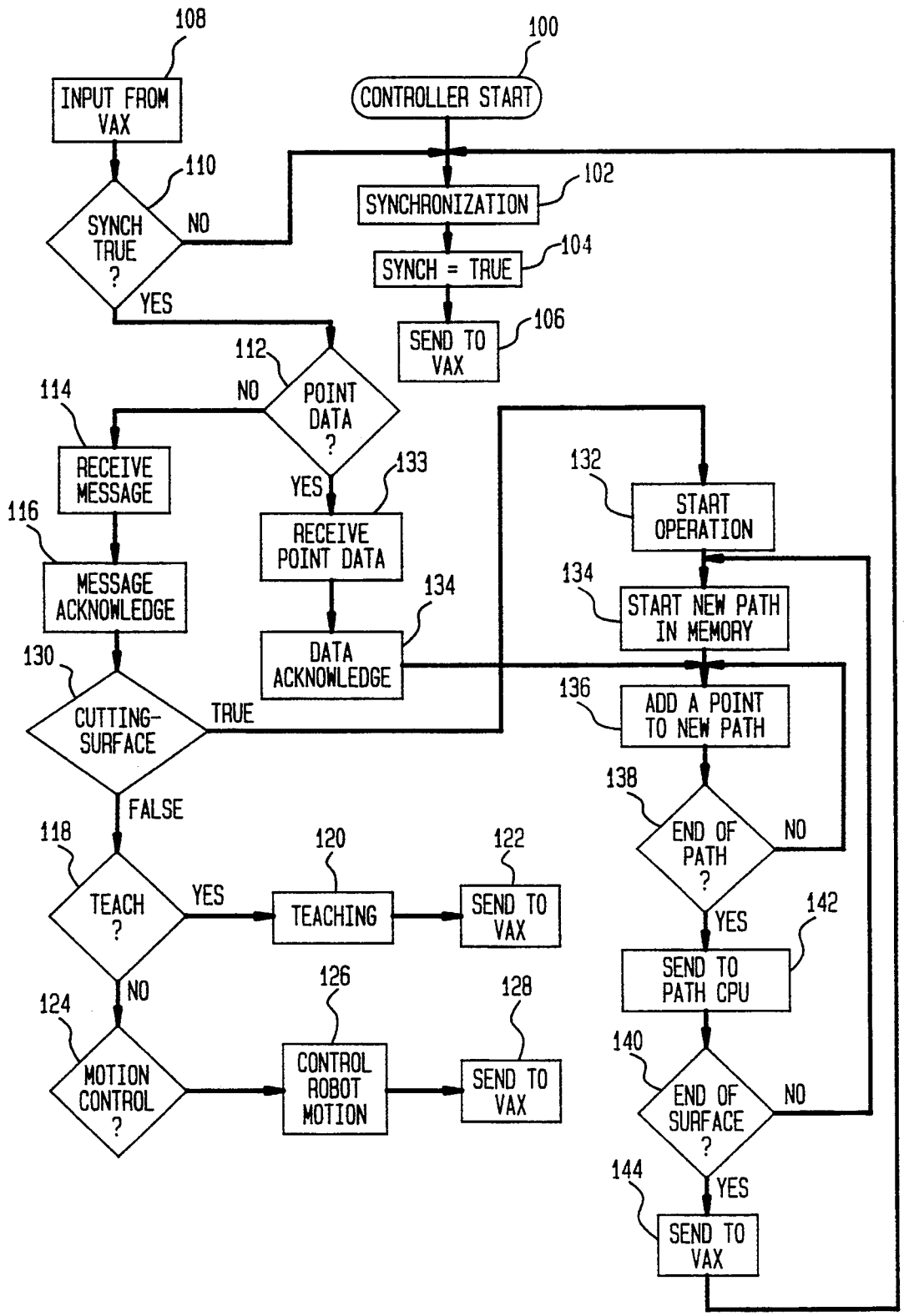

While the path points are being computed the robot is cutting the clay model. Only a minute of precutting computer time is required to furnish the first line of path data to the robot controller. FIGS. 6 and 7 show flow charts for the instructions for the computer 12 and the main CPU of controller 14, respectively, showing the coordination between the two, and FIG. 8 is a flow chart for the path CPU of controller 14. In FIG. 6, when the VAX is started <60>, a synchronization command is sent to the controller <62> and a reply is expected. An input from the controller <64> is checked for a communication error or a time out (a long delay without an input) <66> and any error returns the program control back to the block 62 to attempt synchronization again. A keyboard is checked for an operator input <68> and if an exit command is given <70> the program will stop <72>. Otherwise, a command to manage files <74> will activate a file management routing <76>, a command for motion control or teaching <78> will cause suitable instructions to be sent to the controller <80>, and a command to change parameters <82> will effect changing of parameters <84>. It will be understood that these file management, teaching and motion control and parameter changing routines may be interactive programs which have operator input to specify the actions to be taken. The file management functions include copying, deleting or saving data files, for example. The motion control may entail hold, pause, resume, and abort commands and teach may furnish tool dimension, user frames, home position, etc. Once all these matters are concluded the operator gives a keyboard command setting the cutting-surface flag to True <86>. Then the path generation routine of FIG. 3 is run <88> to produce a path data point which is sent to the controller <90>. After any of the functions <76>, <80>, <84>, or <90> the program flow goes to block 92 which checks for a controller input. If there is a controller input a proper response is made <94> and program control goes back to the keyboard input 68. When a controller input <64> is not a communication error <66> the message is received <96> by translating the input to suitable code for the VAX response. The input message may, for example be information such as point data or tool dimensions which are requested by VAX. If the message were that the robot motion limit is exceeded, the proper response would be a message to the operator. Thus the VAX runs in a loop either taking a keyboard input and reacting to it or receiving a controller input and reacting to it until the operator decides to exit the system.

In FIG. 7, after the main CPU of the controller starts <100>, it responds <102> to the request for synchronization from the VAX by setting the Synch flag to True <104> and sending a message back to the VAX <106>. (The VAX expects every transmission to the controller to be acknowledged.) When the input from VAX <108> agrees that synch has occurred <110>, input messages are separated from point data <112>. If an input is a message it is received <114> by translating it to appropriate code for the controller, and the message is acknowledged <116>. If it is a teach instruction <118> the instruction is executed <120> and the result is sent to the VAX <122>. If it is a motion control instruction <124> the robot motion is controlled accordingly <126> and the information is sent to the VAX <128>. If the VAX has set the Cutting-surface flag to True, this is sent to the controller and detected at block <130>. Then start operations is activated <132> to start building a new path in memory <134>. At this time, point data arriving from the VAX through block <112> is received <133> and acknowledged <134> and is used to add a point to the new path <136>. If the path has not ended <138> a new point is added for each computer loop. If the path has ended another new path is begun <140> and the data is sent to the path CPU <142>. If the end of the surface has been reached <140> this event is sent to the VAX <144> and the loop returns to the synchronization block 102.

Referring to FIG. 8, when the path data is sent to the path CPU by block 142, the robot is activated to start cutting <150> using the new data, provided the previous path is done <152>. If the path is not done yet, the CPU will wait a certain time and recheck <154>. When the path is finished <152> the used data is dumped <156>. Then the robot is controlled to move along the new current path <158>. So long as there is no motion error <160>, the process continues until each path is completed. If motion error does occur, a message is sent to the VAX <162> and the program in the path CPU stops <164>.

This arrangement was used to machine a ⅜ scale clay model of a concept vehicle using a Digital Equipment MicroVax II (TM) computer 12, a GMF KAREL (TM) robot controller 14 and a GMF S-700 robot 16 carrying a milling cutter 20 having a flat end mill. The result was an overall accuracy of better than 0.5 mm and required less hand finishing time than models cut by a 3-axis milling machine. The inaccuracy is now due mainly to the hardware inaccuracy, including calibration error, robot kinematics inaccuracy, gear backlash, etc. Compared to the conventional milling machine, cutting time was reduced from 40 hours to 14 hours and pre-cutting path generating time was reduced from 16 hours to 1 minute.

When any change is made in the desired shape and the change is incorporated in the CAD model, the model recutting for the whole model or just a local portion can commence almost instantly, whereas the prior systems required the total cutting path to be regenerated (requiring hours, even days). Also if it is desired to cut a wire frame model or a surface outline instead of a complete model, that, too, can commence almost instantly.

The embodiments of the invention in which an exclusive property or privilege is claimed are defined as follows:

1. In a system for controlling a path of a multi-axis machine by a mathematical model representing a curve or surface containing the path, a method of controlling the machine comprising the steps of:
   planning the path of the machine in parametric space using the mathematical model by calculating path data points in proper density to minimize a need of interpolation between points, by (a) selecting a time interval for computation of each point in the path, (b) selecting a desired machine path velocity, (c) for each point, determining a ratio of path velocity in parametric space to path velocity in machine coordinate space, (d) determining parametric space velocity from the ratio and the desired path velocity, and (e) calculating a point spacing from the parametric space velocity and the time interval to define a new point;
   translating each point to the coordinate space of the machine; and
   operating the machine along the path defined by the data points.

* * * * *